United States Patent
Yoo et al.

(10) Patent No.: US 9,229,751 B2
(45) Date of Patent: Jan. 5, 2016

(54) APPARATUS AND METHOD FOR MANAGING VIRTUAL MEMORY

(71) Applicant: Samsung Electronics Co., Ltd., Suwon-si (KR)

(72) Inventors: Jung-Hyun Yoo, Gunpo-si (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 239 days.

(21) Appl. No.: 13/688,695

(22) Filed: Nov. 29, 2012

(65) Prior Publication Data
US 2013/0152086 A1    Jun. 13, 2013

(30) Foreign Application Priority Data

Dec. 9, 2011    (KR) .................. 10-2011-0132151

(51) Int. Cl.
| | |
|---|---|
| *G06F 9/45* | (2006.01) |
| *G06F 9/455* | (2006.01) |
| *G06F 9/50* | (2006.01) |
| *G06F 12/08* | (2006.01) |

(52) U.S. Cl.
CPC ............ *G06F 9/455* (2013.01); *G06F 9/45558* (2013.01); *G06F 9/5016* (2013.01); *G06F 12/0806* (2013.01); *G06F 2009/45583* (2013.01); *G06F 2009/45587* (2013.01); *G06F 2212/2542* (2013.01)

(58) Field of Classification Search
CPC . G06F 9/455; G06F 9/45558; G06F 9/45583; G06F 9/5016; G06F 2212/2542; G06F 12/0806

See application file for complete search history.

(56) References Cited

U.S. PATENT DOCUMENTS

| | | | |
|---|---|---|---|
| 7,702,743 B1 * | 4/2010 | Wong ........................... | 709/216 |
| 2006/0136653 A1 | 6/2006 | Traut et al. | |
| 2010/0023565 A1 * | 1/2010 | Colbert et al. ............... | 707/204 |
| 2010/0161879 A1 * | 6/2010 | Nation ............... | G06F 12/0813 711/103 |

FOREIGN PATENT DOCUMENTS

| | | |
|---|---|---|
| KR | 10-0362607 B1 | 11/2002 |
| KR | 10-0518207 B1 | 10/2005 |
| KR | 10-2011-0091134 A | 8/2011 |

* cited by examiner

*Primary Examiner* — Kevin Verbrugge
*Assistant Examiner* — Rocio Del Mar Perez-Velez
(74) *Attorney, Agent, or Firm* — NSIP Law (57) ABSTRACT

A virtual memory management apparatus and method to execute virtual machines in a multi-processor and multi-memory environment are provided. The virtual memory management apparatus includes a virtual system memory manager configured to allocate a virtual system memory to a virtual machine. The virtual memory management apparatus further includes a virtual swap device map storage configured to store location information of virtual swap devices that are able to be allocated to the virtual machine. The virtual memory management apparatus further includes a virtual swap device manager configured to allocate a virtual swap device to the virtual machine with reference to a virtual swap device map.

10 Claims, 8 Drawing Sheets

APPARATUS AND METHOD FOR MANAGING VIRTUAL MEMORY

CROSS-REFERENCE TO RELATED APPLICATION

This application claims the benefit under 35 U.S.C. §119 (a) of a Korean Patent Application No. 10-2011-0132151, filed on Dec. 9, 2011, in the Korean Intellectual Property Office, the entire disclosure of which is incorporated herein by reference for all purposes.

BACKGROUND

1. Field

The following description relates to an apparatus and method for virtual memory management to execute virtual machines in a multi-processor and multi-memory environment.

2. Description of the Related Art

Methods in which a plurality of processors access a memory include Uniform Memory Access (UMA) and Non-Uniform Memory Access (NUMA). In the UMA, a plurality of processors access a memory through a bus and at a same memory access speed. However, as more processors access the memory, more bottleneck results, which leads to deterioration of memory access performance.

In the NUMA, a plurality of processors have their own internal memories, respectively, and the internal memories are connected to each other through a network such that each processor can access the internal memories (that is, external memories with respect to the processor) of other processors as well as its own internal memory. Each processor may access a memory at a different memory access speed based on a location of the memory. In other words, a processor may take a longer time to access an external memory than to access its own internal memory, which may deteriorate memory access performance.

Further, in order to execute a plurality of UMA-based virtual machines (VMs) in a NUMA environment, a virtual machine monitor (VMM) that virtualizes the NUMA environment into a UMA environment is needed. For the virtualization, several methods have been proposed: a method of replicating data being frequently accessed in internal memories of processors, a method of migrating data being frequently accessed to an internal memory of a processor in which access is made, and a method of migrating a task with data being frequently accessed to another processor. However, since these methods require replication, migration, or task migration, respectively, performance overhead may occur. Accordingly, there are difficulties in ensuring memory access performance of application programs, and particularly, in guaranteeing a quality of service (QoS) of tasks requiring frequent memory accesses.

SUMMARY

The following description relates to a virtual memory management apparatus and method to execute virtual machines, which are capable of using an internal memory of another processor or a distributed memory connected through a network, as a virtual swap device, in a multi-processor and multi-memory environment.

In one general aspect, there is provided a virtual memory management apparatus including a virtual system memory manager configured to allocate a virtual system memory to a virtual machine. The virtual memory management apparatus further includes a virtual swap device map storage configured to store location information of virtual swap devices that are able to be allocated to the virtual machine. The virtual memory management apparatus further includes a virtual swap device manager configured to allocate a virtual swap device to the virtual machine with reference to a virtual swap device map.

The virtual swap device map storage stores a logical address of a memory that is to be allocated as the virtual swap device, in correspondence to an index of the virtual swap device.

The virtual system memory manager allocates an internal memory of a processor in which the virtual machine is executed, among a plurality of processors in a physical execution environment of the virtual machine, as the virtual system memory.

The virtual swap device map storage stores location information of an internal memory of another processor among the plurality of processors, and the internal memory is to be allocated as the virtual swap device.

The virtual swap device map storage stores location information of a distributed memory connected to the processor through a network, and the distributed memory is to be allocated as the virtual swap device.

The virtual swap device map storage stores location information of a distributed memory that has transmitted a response message most quickly in response to a call, among a plurality of distributed memories connected through a network, and the distributed memory is to be allocated as the virtual swap device.

In another general aspect, there is provided a virtual memory management method including allocating a virtual system memory to a virtual machine. The virtual memory management method further includes allocating a virtual swap device to the virtual machine with reference to a virtual swap device map that stores location information of virtual swap devices that are able to be allocated to the virtual machine.

The virtual swap device map stores a logical address of a memory that is to be allocated as the virtual swap device, in correspondence to an index of the virtual swap device.

The allocating of the virtual system memory includes allocating an internal memory of a processor in which the virtual machine is executed, among a plurality of processors in a physical execution environment of the virtual machine, as the virtual system memory.

The virtual swap device map stores location information of an internal memory of another processor among the plurality of processors, and the internal memory is to be allocated as the virtual swap device.

The virtual swap device map stores location information of a distributed memory connected to the processor through a network, and the distributed memory is to be allocated as the virtual swap device.

The virtual swap device map stores location information of a distributed memory that has transmitted a response message most quickly in response to a call, among a plurality of distributed memories connected through a network, and the distributed memory is to be allocated as the virtual swap device.

In yet another general aspect, there is provided a virtual memory management method including receiving a swap-in or swap-out request from a virtual machine, the swap-in or swap-out request including a virtual system memory address and a virtual swap device address. The virtual memory management method further includes reading a logical address of a memory corresponding to the virtual swap device address with reference to a virtual swap device map. The virtual memory management method further includes performing a swap-in operation of transferring data stored at the logical address of the memory to a virtual system memory corresponding to the virtual system memory address, or a swap-out operation of transferring data stored in the virtual system memory to the memory having the logical address.

The virtual system memory includes an internal memory of a processor in which the virtual machine is executed, and the memory includes an internal memory of another processor, the internal memory of the processor being allocated as a virtual swap device.

The virtual system memory includes an internal memory of a processor in which the virtual machine is executed, and the memory includes a distributed memory connected through a network to the processor, the distributed memory being allocated as a virtual swap device.

The memory includes a distributed memory that has transmitted a response message most quickly in response to a call, among a plurality of distributed memories connected through a network, the distributed memory being allocated as a virtual swap device.

The allocating of the distributed memory as the virtual swap device includes transmitting a page ask message to the plurality of distributed memories, and selecting the distributed memory having a shortest Round Trip Time from among the plurality of distributed memories that have transmitted messages in response to the page ask message.

The allocating of the distributed memory as the virtual swap device includes transmitting a page request message to the selected distributed memory receiving an accept message including a page identifier (ID) of the selected distributed memory and the logical address in response to the page request message, and registering the page ID and the logical address in the virtual swap device map.

In yet another general aspect, there is provided an apparatus including a controller configured to receive a data transfer request from a virtual machine, the data transfer request including addresses of an internal memory and an external memory. The controller is further configured to transfer data stored in the external memory to the internal memory, or transfer data stored in the internal memory to the external memory, based on the data transfer request.

The internal memory is of a processor in which the virtual machine is executed, and the external memory is of another processor or is connected to the processor through a network.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
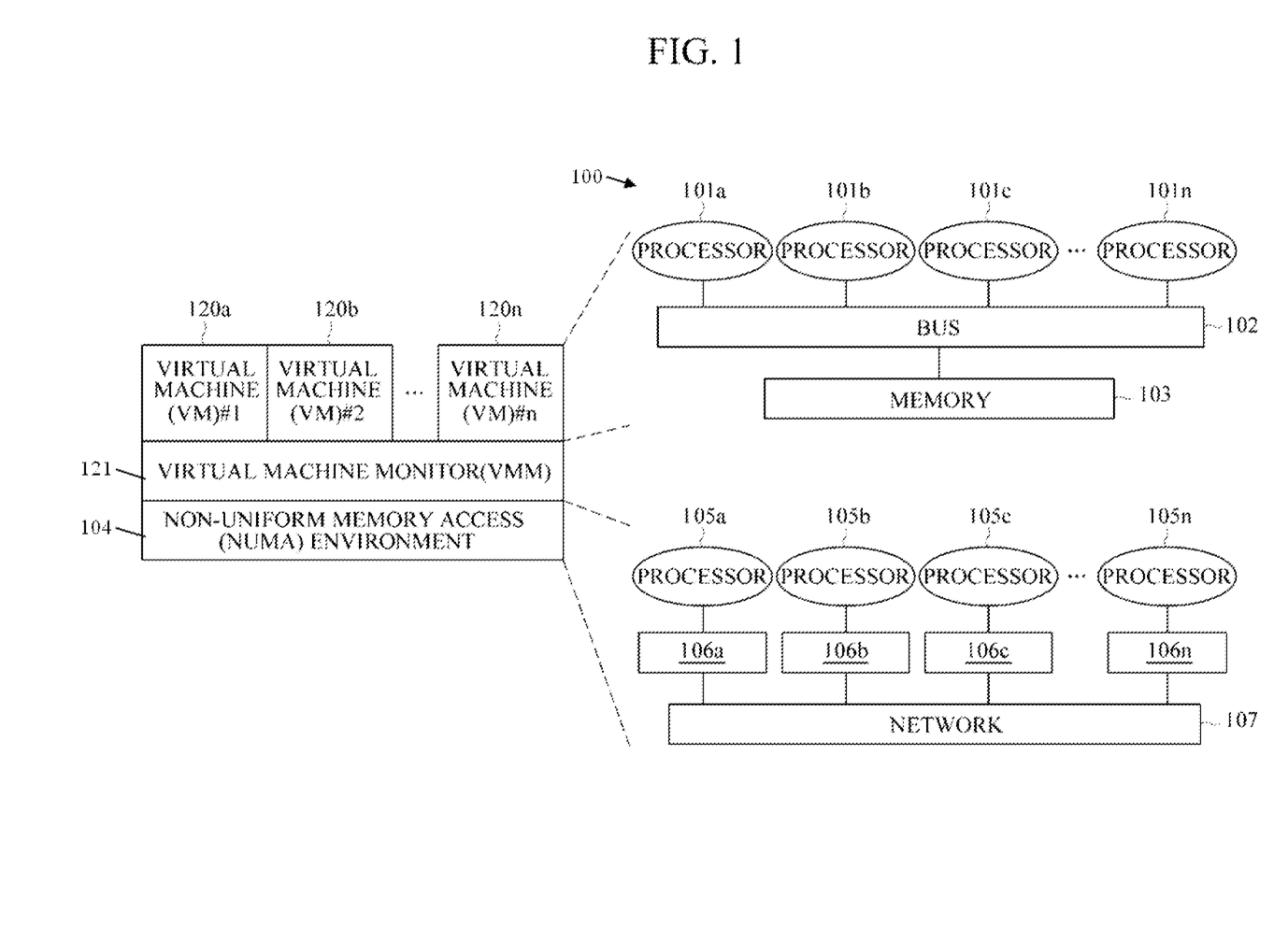
FIG. 1 is a diagram illustrating an example of a virtual machine execution environment.

FIG. 1 is a diagram illustrating an example of a virtual machine execution environment. The virtual machine execution environment may include a Uniform Memory Access (UMA) environment 100, and a Non-Uniform Memory Access (NUMA) environment 104. The UMA environment 100 may include a plurality of processors 101a through 101n that may access a memory 103 through a bus 102. The NUMA environment 104 may include a plurality of processors 105a through 105n that may include internal memories 106a through 106n, respectively. The internal memories 106a through 106n may be connected to each other through a network 107 such that each processor 105a, 105b, 105c, or 105n may access the internal memories of other processors as well as its own respective internal memory 106a, 106b, 106c, or 106n.

In order to execute a plurality of UMA-based virtual machines (VMs) 120a through 120n in the NUMA environment 104, a virtual machine monitor (VMM) 121 configured to virtualize the NUMA environment 104 into the UMA environment 100 may be needed. The VMM may be a microkernel.

Figure 2:
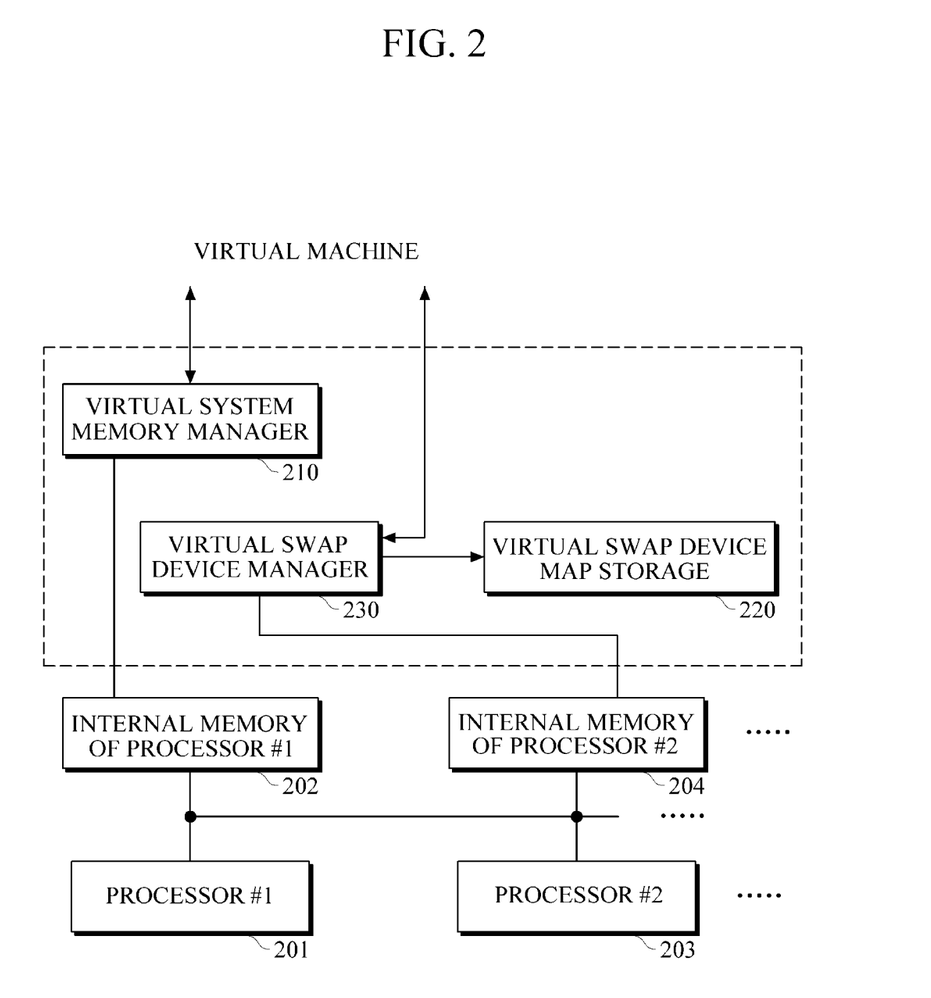
FIG. 2 is a diagram illustrating an example of a virtual memory management apparatus.

FIG. 2 is a diagram illustrating an example of a virtual memory management apparatus. The virtual memory management apparatus may include a virtual system memory manager 210, a virtual swap device map storage 220, and a virtual swap device manager 230. The virtual system memory manager 210 may allocate a virtual system memory to a virtual machine. For example, the virtual system memory manager 210 may allocate an internal memory 202 of a first processor 201 in a NUMA environment, as the virtual system memory. The internal memory 202 of the processor 201 in which the virtual machine is executed may have a higher access speed than those of other memories with respect to the virtual machine.

Further, the virtual system memory manager 210 may check an available capacity of an internal memory of each processor in the NUMA environment, set a processor having a relatively large capacity of memory as a home node, and allocate the memory of the home node as the virtual system memory. In another example, the virtual system memory manager 210 may allocate an available internal memory whose size is greater than a required system memory size of the virtual machine, as the virtual system memory. If there are a plurality of internal memories whose sizes are greater than the required system memory size, the virtual system memory manager 210 may decide between the memories based on a round-robin method.

The virtual swap device map storage 220 may store location information of virtual swap devices that are to be allocated to virtual machines in a virtual swap device map. For example, the virtual swap device map storage 220 may store logical addresses of memories that are to be allocated as virtual swap devices, in correspondence to indexes of the virtual swap devices. In an example, if the internal memory 202 is allocated as the virtual system memory and an internal memory 204 of a second processor 203 in the NUMA environment is to be allocated as a virtual swap device of a virtual machine, the virtual swap device map storage 220 may store location information of the memory 204 as location information of the virtual swap device that is to be allocated to the virtual machine.

The allocated virtual swap device (e.g., the internal memory 204) may act as an external memory of the first processor 201 in which the virtual machine is executed. Accordingly, the virtual swap device may have a relatively lower access speed than that of the virtual system memory. The virtual swap device manager 230 (e.g., a controller) may allocate an arbitrary external memory (e.g., the internal memory 204) as the virtual swap device with reference to the virtual swap device map stored in the virtual swap device map storage 220.

Figure 3:
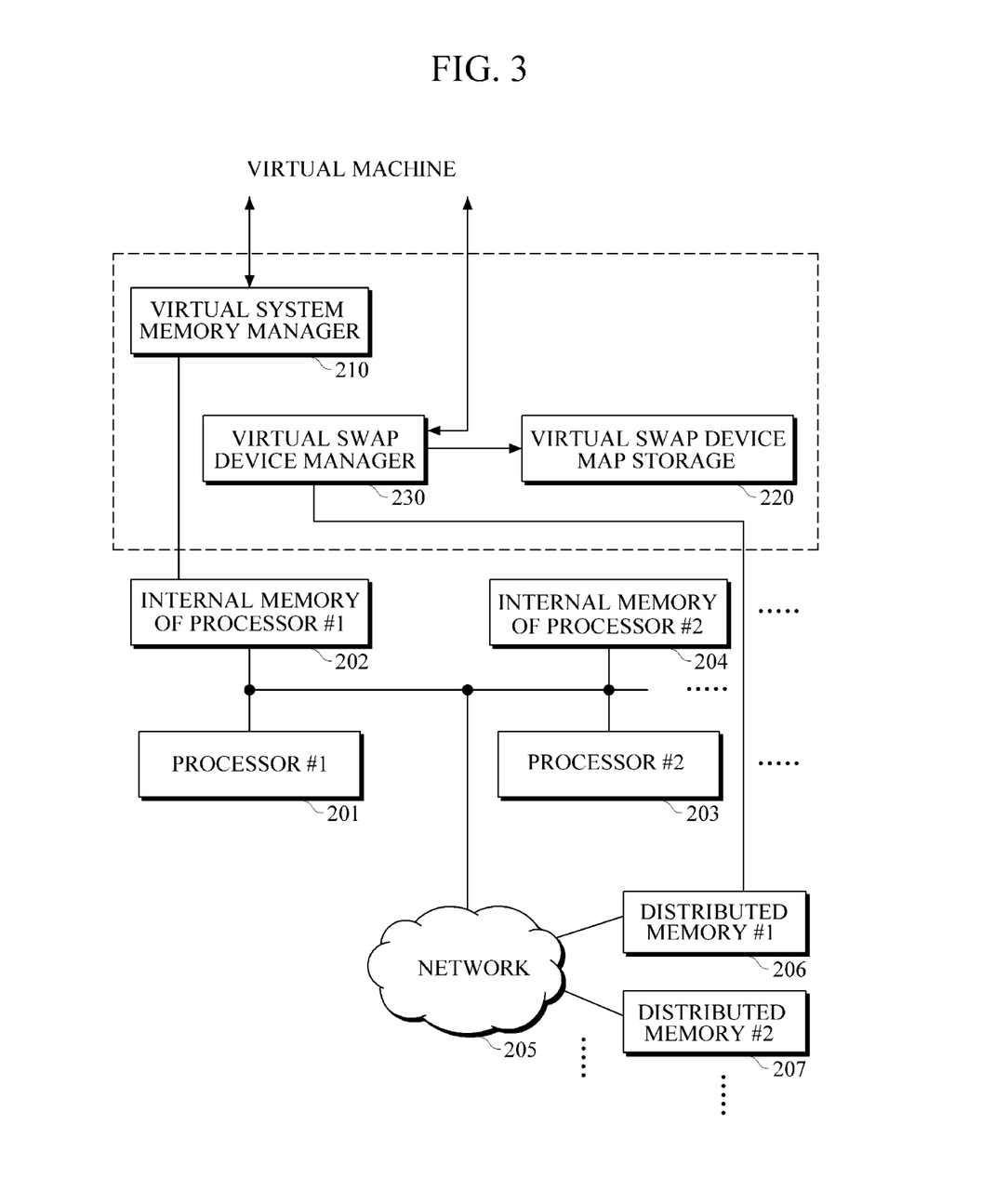
FIG. 3 is a diagram illustrating another example of a virtual memory management apparatus.

FIG. 3 is a diagram illustrating another example of a virtual memory management apparatus. The virtual memory management apparatus may include the virtual system memory manager 210, the virtual swap device map storage 220, and the virtual swap device manager 230. The virtual system memory manager 210 may allocate a virtual system memory to a virtual machine. For example, the virtual system memory manager 210 may allocate the internal memory 202 of the first processor 201 in the NUMA environment, as the virtual system memory. The internal memory 202 may have a relatively higher access speed than those of other memories with respect to the virtual machine.

The virtual swap device map storage 220 may store location information of virtual swap devices that are to be allocated to virtual machines in a virtual swap device map. For example, the virtual swap device map storage 220 may store logical addresses of memories that are to be allocated as the virtual swap devices, in correspondence to indexes of the virtual swap devices. In an example, if the internal memory 202 of the processor 201 in the NUMA environment is allocated as the virtual system memory and distributed memories 206 and 207 connected to the processor 201 through a network 205 in the NUMA environment are allocated as the virtual swap devices, the virtual swap device map storage 220 may store location information of the distributed memories 206 and 207 as location information of the virtual swap devices that are to be allocated to the virtual machines. The virtual swap device map storage 220 may store location information of a distributed memory (for example, the distributed memory 206) that has transmitted a response message most quickly in response to a call, as location information of a virtual swap device that is to be allocated to a corresponding virtual machine. The virtual swap device manager 230 may allocate an arbitrary distributed memory as the virtual swap device with reference to the virtual swap device map stored in the virtual swap device map storage 220.

Figure 4:
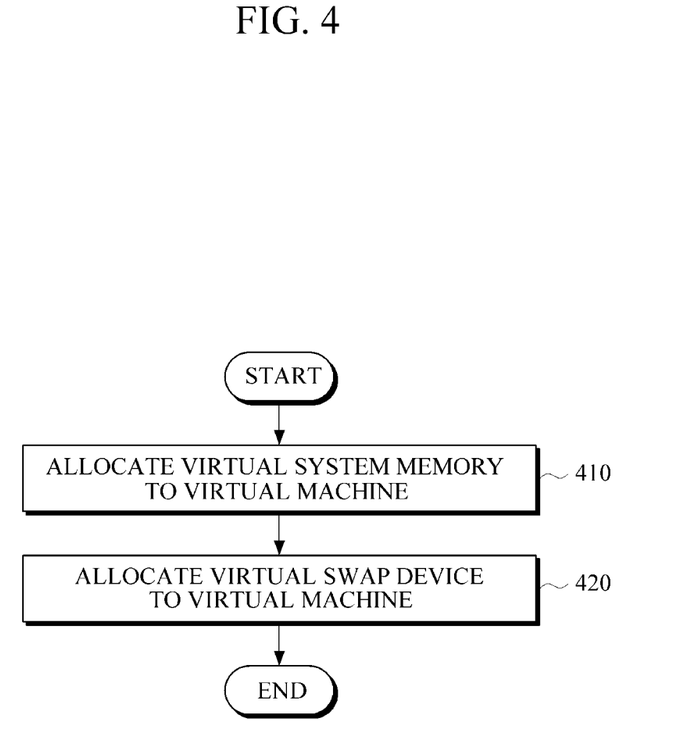
FIG. 4 is a flowchart illustrating an example of a virtual memory management method.

FIG. 4 is a flowchart illustrating an example of a virtual memory management method. At step 410, a virtual system memory may be allocated to a virtual machine. For example, an internal memory of a specific processor in which the virtual machine is executed in a NUMA environment may be allocated as the virtual system memory.

At step 420, a virtual swap device may be allocated to the virtual machine with reference to a virtual swap device map that stores location information of virtual swap devices that are to be allocated to virtual machines. For example, the virtual swap device map may store logical address of each memory that is to be allocated as a virtual swap device, in correspondence to an index of the virtual swap device. In an example, if the internal memory of the specific processor in the NUMA environment is allocated as the virtual system memory and an internal memory of another processor is allocated as the virtual swap device, the virtual swap device map may store location information of the internal memory of the other processor as location information of the virtual swap device that is to be allocated to the virtual machine. Accordingly, an arbitrary external memory may be allocated as the virtual swap device with reference to the virtual swap device map.

As another example, if the internal memory of the specific processor in the NUMA environment is allocated as the virtual system memory and a distributed memory connected to the specific processor through a network in the NUMA environment is allocated as the virtual swap device, the virtual swap device map may store location information of the distributed memory as location information of the virtual swap device that is to be allocated to the virtual machine. The location information of a distributed memory that has transmitted a response message most quickly in response to a call, among a plurality of distributed memories connected to the specific processor through the network, may be stored as location information of the virtual swap device that is to be allocated to the virtual machine. Accordingly, an arbitrary distributed memory may be allocated as the virtual swap device with reference to the virtual swap device map.

Figure 5:
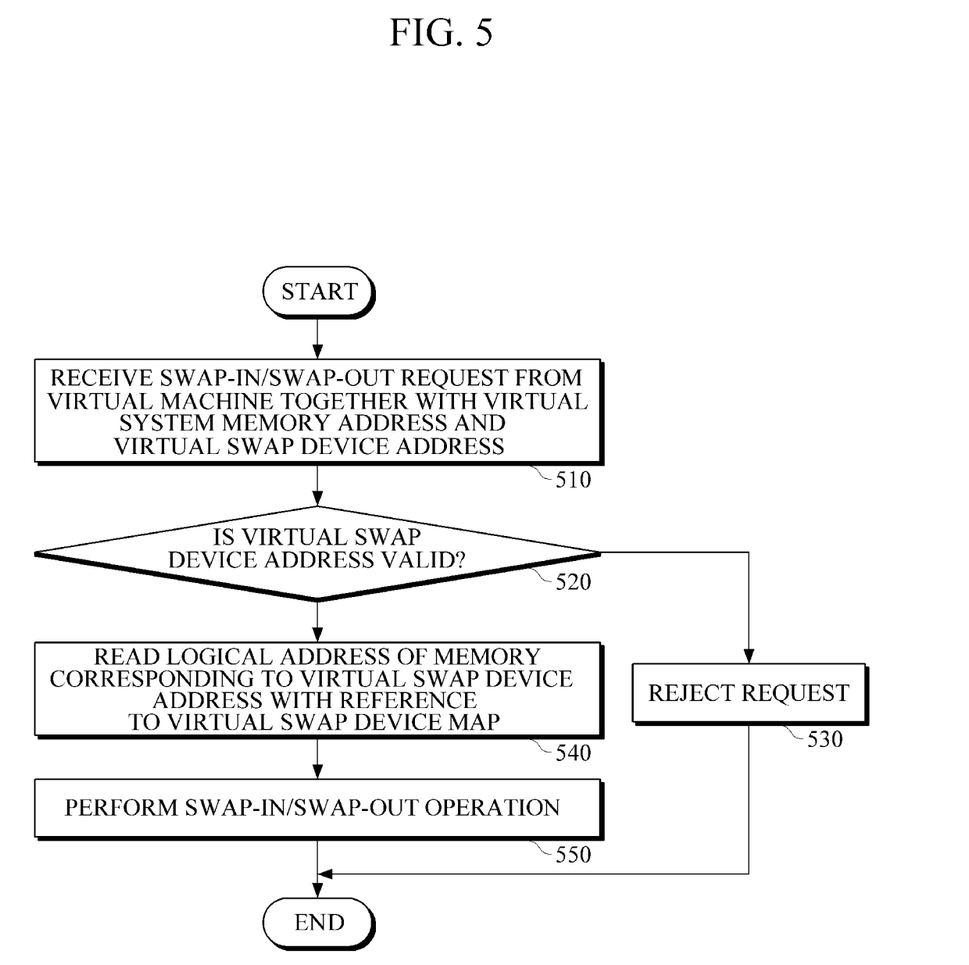
FIG. 5 is a flowchart illustrating an example of a swap-in/swap-out operation.

FIG. 5 is a flowchart illustrating an example of a swap-in/swap-out operation. At step 510, a swap-in/swap-out request may be received from a virtual machine, together with a virtual system memory address and a virtual swap device address. At step 520, it is determined whether the virtual swap device address is valid. If the virtual swap device address is not valid, at step 530, the swap-in/swap-out request is rejected, and the process is terminated.

If the virtual swap device address is valid, at step 540, a logical address of a memory corresponding to the virtual swap device address may be read with reference to a virtual swap device map. For example, if an internal memory of a specific processor in a NUMA environment is allocated as a virtual system memory of the virtual machine and an internal memory of another processor is allocated as a virtual swap device of the virtual machine, the virtual swap device map may store location information, namely, a logical address, of the internal memory of the other processor. As another example, if the internal memory of the specific processor is allocated as the virtual system memory and a distributed memory connected to the specific processor through a network in the NUMA environment is allocated as the virtual swap device, the virtual swap device map may store location information, namely, a logical address, of the distributed memory. In another example, location information of a distributed memory that has transmitted a response message most quickly in response to a call, among a plurality of distributed memories connected to the specific processor through the network, may be stored as location information of the virtual swap device that is to be allocated to the virtual machine.

At step 550, the swap-in/swap-out operation may be performed. For example, data stored at the logical address of the virtual swap device may be transferred to the virtual system memory (swap-in), or data stored in the virtual system memory may be transferred to the virtual swap device having the logical address (swap-out). Accordingly, through the swap-in operation, the virtual machine may have, for example, frequently-accessed data stored in the virtual swap device (e.g., an external memory) transferred into the virtual system memory (e.g., an internal memory) having a higher access speed. Through the swap-out operation, the virtual machine may have, for example, less frequently-accessed data stored in the virtual system memory transferred out to the virtual swap device having a lower access speed.

Figure 6:
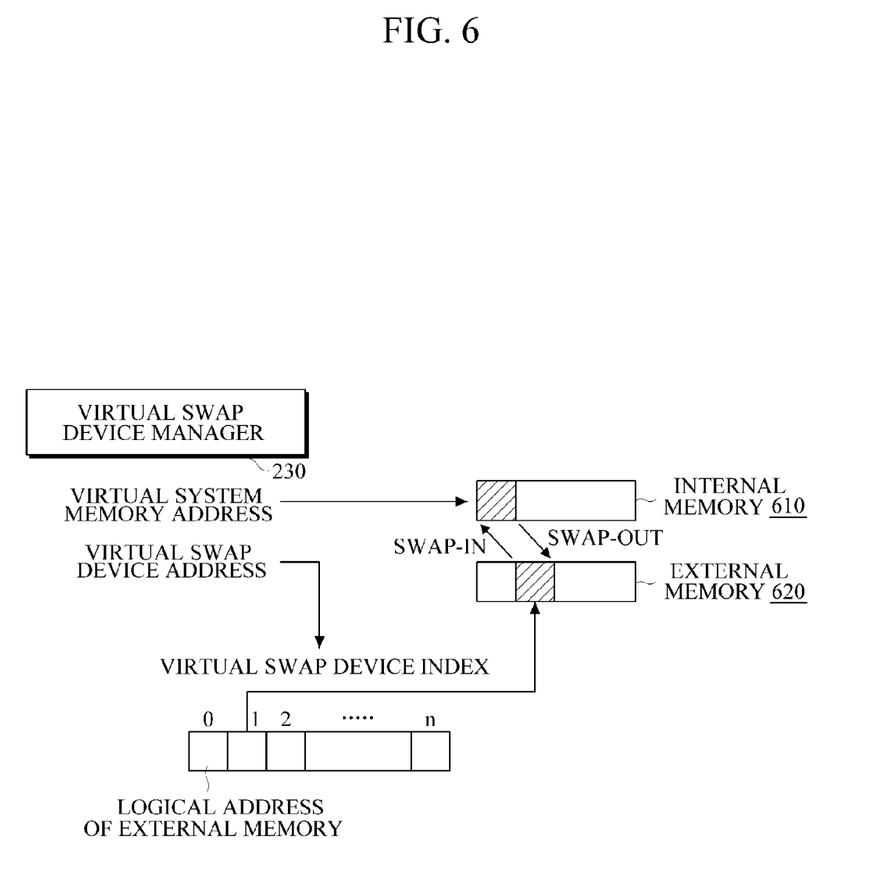
FIG. 6 is a diagram illustrating an example of a swap-in/swap-out operation.

FIG. 6 is a diagram illustrating an example of a swap-in/swap-out operation. Referring to FIGS. 3 and 6, when a swap-in/swap-out request is received from a virtual machine together with a virtual system memory address and a virtual swap device address, the virtual swap device manager 230 may execute a swap-in/swap-out operation. For example, in the case of a swap-in operation, data stored in an external memory 620 corresponding to the virtual swap device address may be transferred to an internal memory 610 corresponding to the virtual system memory address. In the case of a swap-out operation, on the contrary, data stored in the internal memory 610 corresponding to the virtual system memory address may be transferred to the external memory 620 corresponding to the virtual swap device address. The virtual swap device address may correspond to a logical address of the external memory 620 stored in a virtual swap device map, and the logical address may correspond to a virtual swap device index that indicates a relevant location in the external memory 620.

Figure 7:
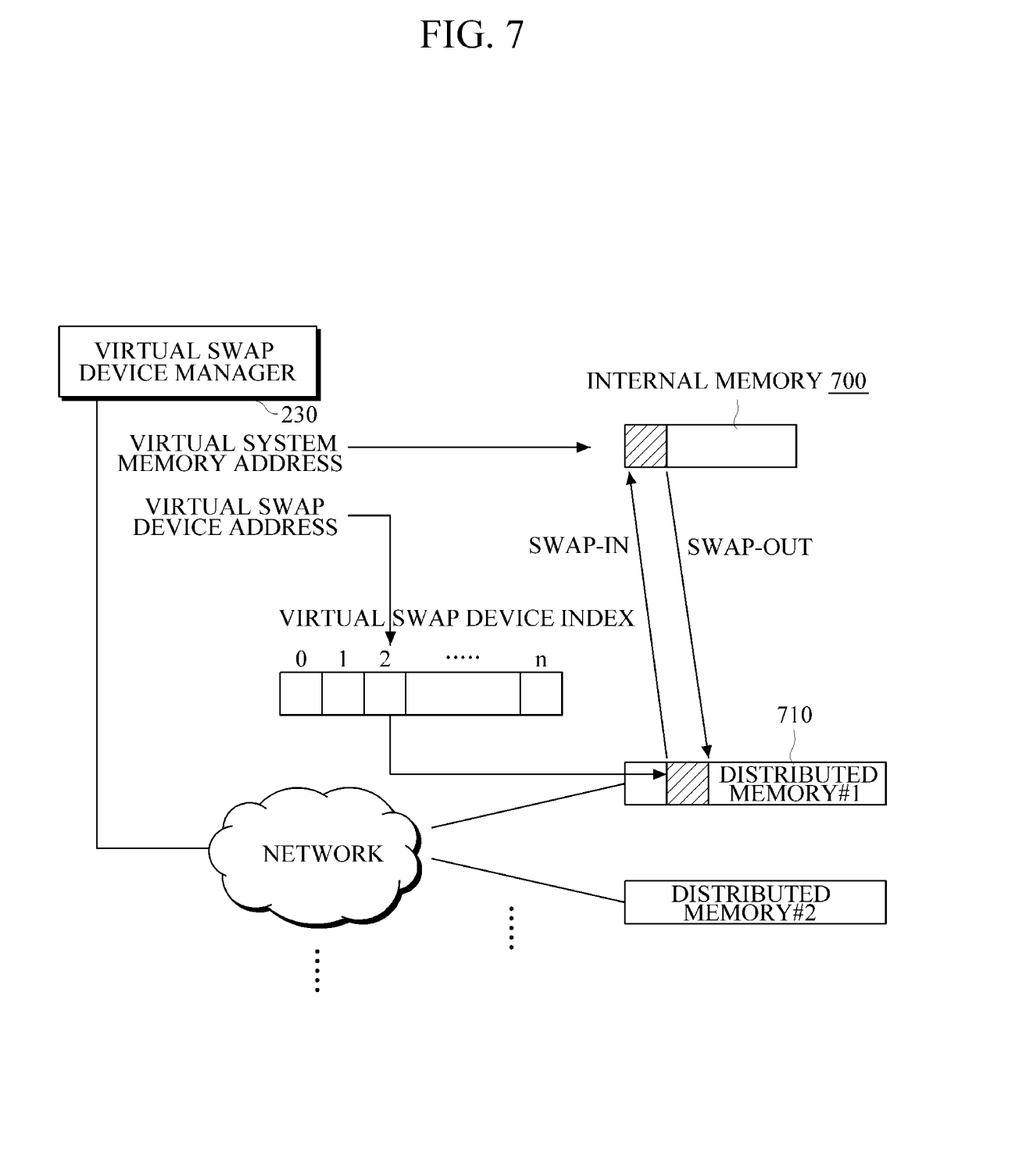
FIG. 7 is a diagram illustrating another example of a swap-in/swap-out operation.

FIG. 7 is a diagram illustrating another example of a swap-in/swap-out operation. Referring to FIGS. 3 and 7, when a swap-in/swap-out request is received from a virtual machine together with a virtual system memory address and a virtual swap device address, the virtual swap device manager 230 may execute a swap-in/swap-out operation. For example, in the case of swap-in operation, data stored in a distributed memory 710 corresponding to the virtual swap device address may be transferred to an internal memory 700 corresponding to the virtual system memory address. In the case of a swap-out operation, on the contrary, data stored in the internal memory 700 corresponding to the virtual system memory address may be transferred to the distributed memory 710 corresponding to the virtual swap device address. The virtual swap device address may correspond to a logical address of the distributed memory 710 stored in a virtual swap device map, and the logical address may correspond to a virtual swap device index that indicates a relevant location in the distributed memory 710.

Figure 8:
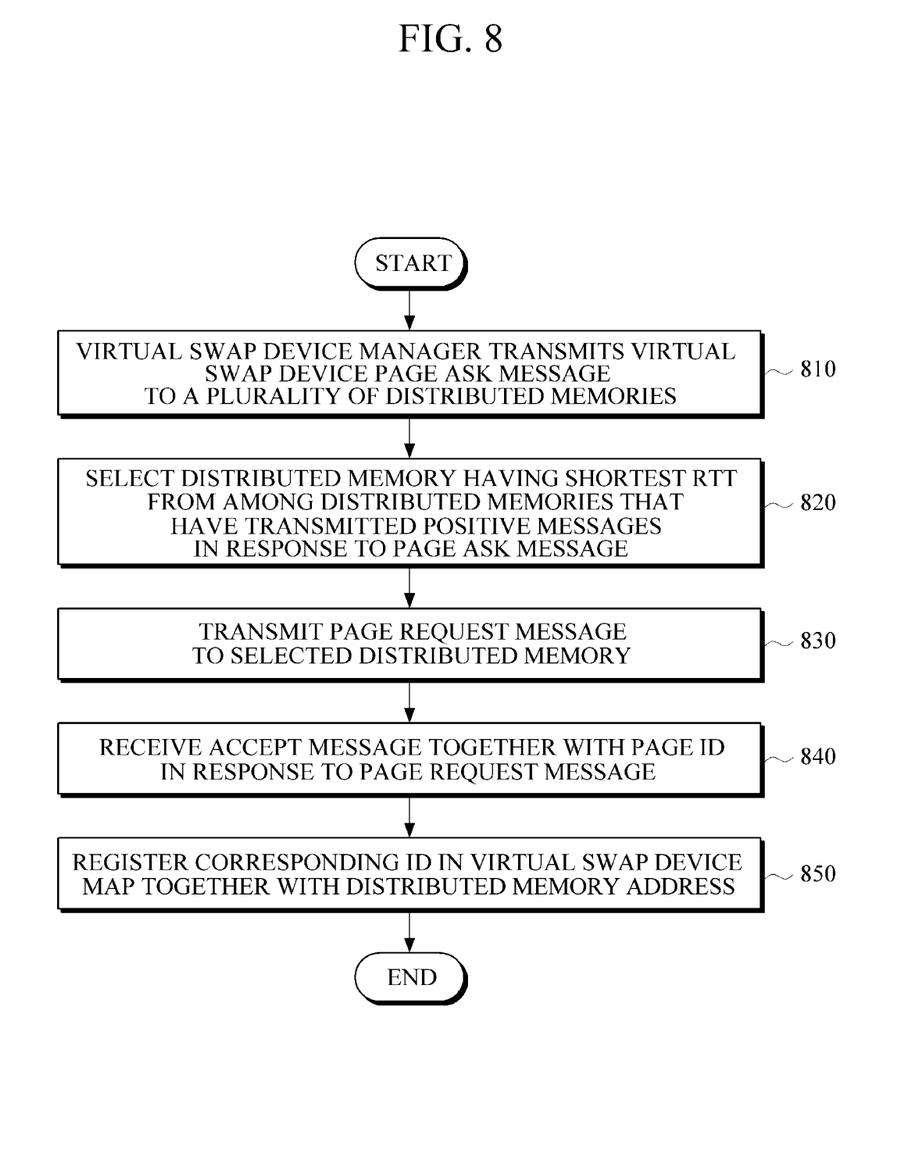
FIG. 8 is a flowchart illustrating an example of a method of determining a distributed memory as a virtual swap device.

FIG. 8 is a flowchart illustrating an example of a method of determining a distributed memory as a virtual swap device. A distributed memory that has transmitted a response message most quickly in response to a call, among a plurality of distributed memories connected through a network, may be allocated as a virtual swap device. To perform this allocation, at step 810, the virtual swap device manager 230 (in, e.g., FIG. 3) may transmit a virtual swap device page ask message (referred to hereinafter as a page ask message) to the distributed memories. If the virtual swap device manager 230 receives no response to the page ask message, the virtual swap device manager 230 may continue to send the page ask message until a response is received from any one of the distributed memories.

If there are two or more distributed memories that have sent positive messages in response to the page ask message, at step 820, a distributed memory having a shortest Round Trip Time (RTT) among the distributed memories may be selected. At step 830, a page request message may be transmitted to the selected distributed memory. If no response to the page request message is received, the process may return to step 810 of transmitting the page ask message.

At step 840, an accept message may be received in response to the page request message together with a page identifier (ID) of the distributed memory and a corresponding distributed memory address, e.g., a logical address of the selected distributed memory. At step 850, the page ID may be registered in a virtual swap device map together with the corresponding distributed memory address.

According to the teachings above, there is provided an apparatus and method that may enhance memory use efficiency and reduce overhead influencing memory access performance. Accordingly, it is possible to improve execution performance of application programs. Furthermore, performance of existing UMA-based virtual machines may be improved by applying characteristics of a NUMA environment to the UMA-based virtual machines without having to implement data migration, replication, etc. in the UMA-based virtual machines.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A virtual memory management apparatus comprising:
a virtual system memory manager configured to allocate a virtual system memory to a virtual machine;
a virtual swap device map storage configured to store location information of virtual swap devices that are able to be allocated to the virtual machine; and
a virtual swap device manager configured to allocate a virtual swap device to the virtual machine with reference to a virtual swap device map,
wherein the virtual swap device map storage stores location information of a distributed memory that has transmitted a response message most quickly in response to a call, among a plurality of distributed memories connected through a network, and the distributed memory is to be allocated as the virtual swap device.

2. The virtual memory management apparatus of claim 1, wherein the virtual swap device map storage stores a logical address of a memory that is to be allocated as the virtual swap device, in correspondence to an index of the virtual swap device.

3. The virtual memory management apparatus of claim 1, wherein the virtual system memory manager allocates an internal memory of a processor in which the virtual machine is executed, among a plurality of processors in a physical execution environment of the virtual machine, as the virtual system memory.

4. The virtual memory management apparatus of claim 3, wherein the virtual swap device map storage stores location information of an internal memory of another processor among the plurality of processors, and the internal memory is to be allocated as the virtual swap device.

5. The virtual memory management apparatus of claim 3, wherein the virtual swap device map storage stores location information of a distributed memory connected to the processor through a network, and the distributed memory is to be allocated as the virtual swap device.

6. A virtual memory management method comprising:
allocating a virtual system memory to a virtual machine; and
allocating a virtual swap device to the virtual machine with reference to a virtual swap device map that stores location information of virtual swap devices that are able to be allocated to the virtual machine,
wherein the virtual swap device map stores location information of a distributed memory that has transmitted a response message most quickly in response to a call, among a plurality of distributed memories connected through a network, and the distributed memory is to be allocated as the virtual swap device.

7. The virtual memory management method of claim 6, wherein the virtual swap device map stores a logical address of a memory that is to be allocated as the virtual swap device, in correspondence to an index of the virtual swap device.

8. The virtual memory management method of claim 6, wherein the allocating of the virtual system memory comprises allocating an internal memory of a processor in which the virtual machine is executed, among a plurality of processors in a physical execution environment of the virtual machine, as the virtual system memory.

9. The virtual memory management method of claim 8, wherein the virtual swap device map stores location information of an internal memory of another processor among the plurality of processors, and the internal memory is to be allocated as the virtual swap device.

10. The virtual memory management method of claim 8, wherein the virtual swap device map stores location information of a distributed memory connected to the processor through a network, and the distributed memory is to be allocated as the virtual swap device.

* * * * *